(12) United States Patent
Huang et al.

(10) Patent No.: US 10,374,852 B1
(45) Date of Patent: Aug. 6, 2019

(54) KA-BAND MODULATOR AND TRANSMITTER

(71) Applicant: The United States of America as represented by the Administrator of NASA, Washington, DC (US)

(72) Inventors: Wei-Chung Huang, College Park, MD (US); Jeffrey M. Jaso, Olney, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 0 days.

(21) Appl. No.: 16/125,938

(22) Filed: Sep. 10, 2018

(51) Int. Cl.
| *H04L 1/00* | (2006.01) |
| *H04L 27/20* | (2006.01) |
| *H04L 25/03* | (2006.01) |
| *H04B 7/185* | (2006.01) |
| *H04L 7/04* | (2006.01) |
| *H04L 7/00* | (2006.01) |

(52) U.S. Cl.
CPC ..... *H04L 27/2053* (2013.01); *H04B 7/18582* (2013.01); *H04L 1/0041* (2013.01); *H04L 1/0058* (2013.01); *H04L 7/0091* (2013.01); *H04L 7/048* (2013.01); *H04L 25/03834* (2013.01)

(58) Field of Classification Search
CPC . H04L 27/2053; H04L 1/0041; H04L 1/0058; H04L 7/0091; H04L 7/048; H04L 25/03834; H04B 7/18582
See application file for complete search history.

(56) References Cited

U.S. PATENT DOCUMENTS

| 6,459,742 | B1 * | 10/2002 | Marque-Pucheu | H04L 25/03834 332/103 |
| 6,738,935 | B1 * | 5/2004 | Kimmitt | H04L 1/0045 370/464 |
| 2012/0263251 | A1 * | 10/2012 | Djordjevic | H04L 1/0042 375/261 |
| 2012/0280749 | A1 * | 11/2012 | Kumar | H03F 1/3294 330/149 |
| 2014/0270759 | A1 * | 9/2014 | Djordjevic | H04L 1/0043 398/44 |

* cited by examiner

*Primary Examiner* — Janice N Tieu
(74) *Attorney, Agent, or Firm* — Christopher O. Edwards; Bryan A. Geurts; Mark P. Dvorscak

(57) ABSTRACT

The present invention relates to a high data rate Ka-band modulator and transmitter for space applications that functions on the entire NASA Space Network Return Link band of 25.25-27.75 GHz. The modulator is capable of quadrature phase-shift keying (QPSK) modulation and 8-PSK modulation. The transmitter can be designed to provide an adjustable drive to a traveling-wave tube amplifier (TWTA) or transmit power.

20 Claims, 3 Drawing Sheets

KA-BAND MODULATOR AND TRANSMITTER

ORIGIN OF THE INVENTION

The invention described herein was at least in-part made by an employee of the United States Government and may be manufactured or used by or for the Government of the United States of American for governmental purposes without the payment of any royalties thereon or therefor.

BACKGROUND OF THE INVENTION

1. Field of the Invention

The present invention relates to a high data rate Ka-band modulator and transmitter for space applications. The modulator is capable of quadrature phase-shift keying (QPSK) modulation and 8-PSK modulation. The transmitter can be designed to provide an adjustable drive to a traveling-wave tube amplifier (TWTA) or transmit power.

2. Description of the Related Art

The scientific community requires more science data, faster, and meeting this demand requires leveraging existing flight heritage technology and developing hardware beyond the state-of-the-art. Existing Ka-band modulators for solar observation space applications include a 300 Mbps quadrature phase-shift keying (QPSK) Ka-band modulator with a 2.5 watts solid state power amplifier (SSPA). This Ka-band transmitter could operate up to 800 Mbps, but existing space mission applications require only 300 Mbps.

In another lunar orbiter space application, a Ka-band modulator with three switchable rates from 57-228 Mbps, is used with a commercially supplied traveling-wave tube amplifier (TWTA).

However, with both these designs for space applications, the Ka-band modulator depends on the Command and Data Handling (C&DH) card to deliver the data clock. As observed on existing solar observation space applications, the additive jitter from the C&DH clock caused a 1 dB degradation in a 150 Mbps Ka-band communications link. That degradation is increasingly worse and unacceptable at higher data rates. Further, these previous designs for space applications were designed for a limited range of data rates and operating frequencies.

Accordingly, a high data rate Ka-band modulator and transmitter is needed for space applications that does not have the above deficiencies.

SUMMARY OF THE INVENTION

The present invention relates to a high data rate Ka-band modulator and transmitter for space applications. The modulator is capable of quadrature phase-shift keying (QPSK) modulation and 8-PSK modulation. The transmitter can be designed to provide an adjustable drive to a traveling-wave tube amplifier (TWTA) or transmit power.

In one embodiment, a Ka-band transmitter, includes: a first modulator including a field programmable gate array (FPGA), the FPGA including: a serializer/deserializer (SerDes), which receives data in a data stream; a buffer which buffers the data in the data stream; a low-density parity check (LDPC) encoder which encodes the data in the data stream with a 7/8 LDPC error-correcting code to result in a data stream of encoded symbols; a randomizer which randomizes the encoded symbols in the data stream; an in-phase/quadrature (I/Q) splitter which splits the encoded symbols in the data stream into an I channel data stream and a Q channel data stream; a plurality of pulse shapers for each I channel data stream and Q channel data stream, such that rates of the I channel data stream and the Q channel data stream of the encoded symbols below 400 Msps are digitally filtered with a root-raised cosine filter; wherein resulting digitally filtered encoded symbols in the I channel data stream and the Q channel data stream are parallelized into 12-bit words which are each clocked exiting said FPGA; a plurality of digital-to-analog converters (DACs) which receive the 12-bit words from the FPGA to form an I analog baseband signal and a Q analog baseband signal; a tunable filter bank including a plurality of low-pass analog filters which filter the I baseband signal and the Q baseband signal; a second harmonic vector modulator which receives the filtered I baseband signal and the Q baseband signal from the tunable filter bank; a synthesizer including a local oscillator which pumps said second harmonic vector modulator; wherein a resulting radio frequency (RF) output is an Offset Quadrature Phase Shift Keying (OQPSK) modulated signal at a center frequency equal to:

$2^*f_{LO}+f_{IF}$, where $f_{IF}$ is a total encoded symbol rate and $f_{LO}$ is a local oscillator frequency; and wherein the RF output is in a Ka-band frequency range including inside a Ka-band return link range of 25.25-27.75 GHz.

In one embodiment, the transmitter further includes: a first low-pass analog filter which receives output from the second harmonic vector modulator; a first low-noise amplifier (LNA) which receives output from the first low-pass analog filter; a variable-voltage attenuator (VVA) which attenuates the output from the first low-noise amplifier (LNA); a second low-noise amplifier (LNA) which receives the attenuated output from the variable-voltage attenuator (VVA); a second low-pass analog filter which receives output from the second low-noise amplifier (LNA); a medium-power amplifier (MPA) which receives output from the second low-pass analog filter and emits a signal output; and a microstrip-to-waveguide transition which receives the signal output from the medium-power amplifier (MPA) and converts the signal output to a waveguide signal output, to produce the radio frequency (RF) output.

In one embodiment, the transmitter further includes: a balanced power combiner disposed between the medium power amplifier (MPA) and the microstrip-to-waveguide transition, the balanced combiner which includes a 90-degrees phase shifter which splits output from the medium-power amplifier (MPA) evenly from the phase shifter into two power outputs and forwards the two power outputs to a waveguide hybrid coupler; wherein the phase shifter and the waveguide hybrid coupler provide wideband phase and amplitude balance over said Ka-band return link range of 25.25-27.75 GHz.

In one embodiment, the balanced power combiner further includes: two high-power amplifiers which receive the two power outputs from the phase shifter; wherein the waveguide hybrid coupler minimizes output losses in the two high-power amplifiers.

In one embodiment, the SerDes functions up to 3.125 Gsps.

In one embodiment, the first modulator can survive a minimum total ionizing dose of 100 krad-Si, a minimum displacement damage dose of $6.67 \times 10^8$ MeV/g or a 10 MeV equivalent proton fluence of $8.45 \times 10^{10}$ $cm^{-2}$; a $5.50 \times 10^8$ MeV/g or a 10 MeV equivalent proton fluence of $8.35\times10^{10}$ cm$^{-2}$, and a single-event latch-up threshold exceeding 37 MeV-cm$^2$/mg.

In one embodiment, a power level of the radio frequency (RF) output can be set within any value within a range of −5 dBm-+3 dBm in 0.5 dB increments, using external universal asynchronous receiver/transmitter (UART) commands.

In one embodiment, a maximum rate of the OQPSK signal is 1200 Msps, and a maximum 8-PSK symbol rate is 1800 Msps.

In one embodiment, the synthesizer further includes: a serializer/deserializer (Ser/Des) clock; a symbol clock; and a reference oscillator; wherein the local oscillator, the serializer/deserializer (Ser/Des) clock, and a clock of at least one of the digital-to-analog converters (DAC), are all coherent with the reference oscillator.

In one embodiment, the reference oscillator is an oven-controlled crystal oscillator.

In one embodiment, the SerDes clock 114 has a 100 Hz resolution over a range 100-160 MHz.

In one embodiment, the filtered I baseband signal and the filtered Q baseband signal received by the second harmonic vector modulator require digital pulse shaping with the plurality of low-pass analog filters, at below the rate of 400 Msps, to meet predetermined spectral mask requirements.

In one embodiment, the plurality of low-pass analog filters are used exclusively for baseband filtering at rates of 400 Msps and above.

In one embodiment, the tunable filter bank includes four low-pass analog filters, and a range of symbol rate is divided into four sub-ranges each assigned to one filter of each of the four low-pass analog filters; and wherein when a symbol rate is selected, an appropriate one of the four low-pass analog filters is selected by setting control lines of an input and an output radio frequency (RF) single pull 4-throw switches (SS4T).

In one embodiment, a cutoff frequency of each of the four low-pass analog filters is tunable so that an exact filter cutoff frequency suitable for a given symbol rate can be selected.

In one embodiment, a plurality of variable capacitance diodes includes the plurality of low-pass analog filters; and wherein a tuning of the modulator and the transmitter is accomplished by applying a control voltage to the variable capacitance diodes with the digital-to-analogue converters (DACs).

In one embodiment, a method of providing a high data rate Ka-band modulator and transmitter for space applications, includes: receiving data in a data stream into a serializer/deserializer (SerDes) of a field programmable gate array (FPGA) of a first modulator; buffering the data from the serializer/deserializer (SerDes); encoding the data in the data stream using a low-density parity check (LDPC) encoder with a 7/8 LDPC error-correcting code to result in a data stream of encoded symbols; randomizing the encoded symbols in the data stream; splitting the encoded symbols in the data stream into an I channel data stream and a Q channel data stream; digitally filtering each I channel data stream and Q channel data stream, such that rates of the I channel data stream and the Q channel data stream of the encoded symbols below 400 Msps are digitally filtered with a root-raised cosine filter; parallelizing resulting digitally filtered encoded symbols in the I channel data stream and the Q channel data stream into 12-bit words which are each clocked exiting the FPGA; receiving the 12-bit words from the FPGA into a plurality of digital-to-analog converters (DACs) to form an I analog baseband signal and a Q analog baseband signal; filtering the I baseband signal and the Q baseband signal using a tunable filter bank having a plurality of low-pass analog filters; receiving the filtered I baseband signal and the Q baseband signal into a second harmonic vector modulator; pumping the second harmonic vector modulator using a synthesizer having a local oscillator; wherein a resulting radio frequency (RF) output is an Offset Quadrature Phase Shift Keying (OQPSK) modulated signal at a center frequency equal to:

$$2*f_{LO}+f_{IF},$$

where $f_{IF}$ is a total encoded symbol rate and $f_{LO}$ is a local oscillator frequency; and wherein the RF output is in a Ka-band frequency range including inside a Ka-band return link range of 25.25-27.75 GHz.

In one embodiment, a power level of the radio frequency (RF) output can be set within any value within a range of −5 dBm-+3 dBm in 0.5 dB increments, using external universal asynchronous receiver/transmitter (UART) commands.

In one embodiment, a maximum rate of the OQPSK signal is 1200 Msps, and a maximum 8-PSK symbol rate is 1800 Msps.

In one embodiment, the filtered I baseband signal and the filtered Q baseband signal received by the second harmonic vector modulator require digital pulse shaping with the plurality of low-pass analog filters, at below the rate of 400 Msps, to meet predetermined spectral mask requirements; and wherein the plurality of low-pass analog filters are used exclusively for baseband filtering at rates of 400 Msps and above.

Thus, has been outlined, some features consistent with the present invention in order that the detailed description thereof that follows may be better understood, and in order that the present contribution to the art may be better appreciated. There are, of course, additional features consistent with the present invention that will be described below and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the methods and apparatuses consistent with the present invention.

BRIEF DESCRIPTION OF THE DRAWINGS

The description of the drawings are only exemplary embodiments of the disclosure and not to be considered as limiting in scope.

DESCRIPTION OF THE INVENTION

The present invention relates to a high data rate Ka-band modulator and transmitter for space applications. The modulator is capable of quadrature phase-shift keying (QPSK) modulation and 8-PSK modulation. The transmitter can be designed to provide an adjustable drive to a traveling-wave tube amplifier (TWTA) or transmit power.

Figure 1:
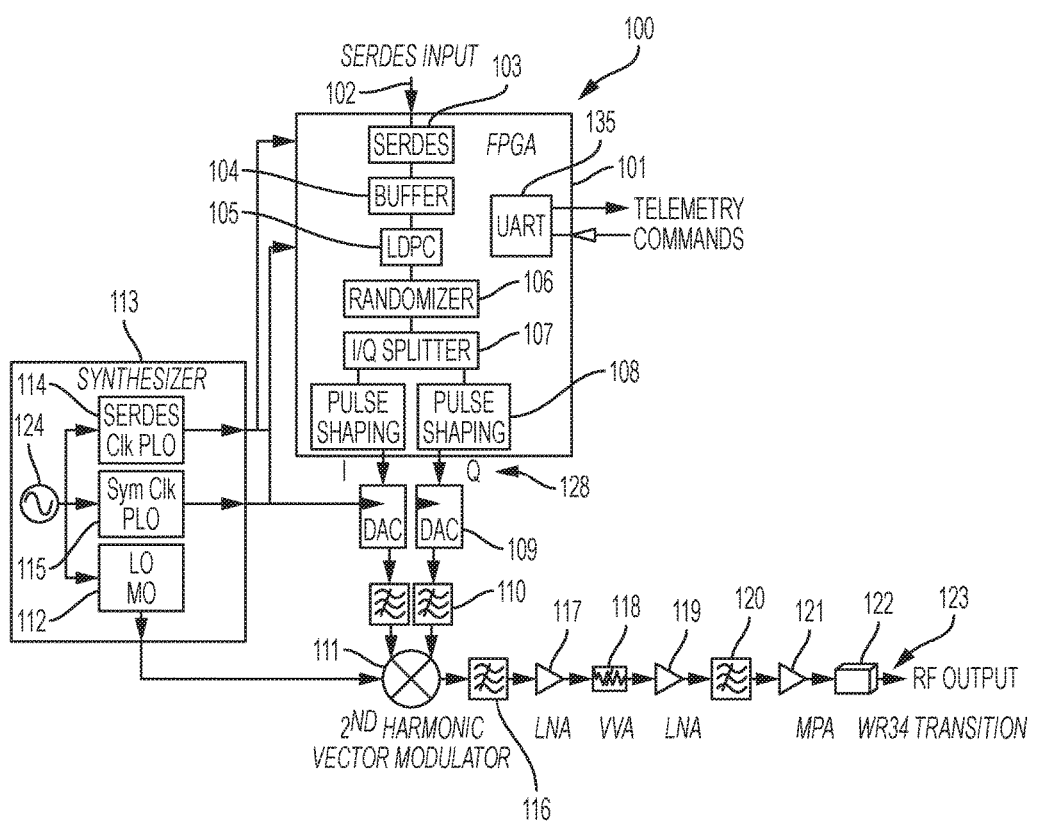
FIG. 1 depicts a schematic diagram of the Ka-band modulator and transmitter, according to one embodiment consistent with the present invention.

In one embodiment, the high rate Ka-band modulator 100 of the present invention (see FIG. 1) is a high-speed radiation hardened modulator 100 that functions on the entire NASA Space Network Return Link band of 25.25-27.75 GHz. In one embodiment, all of the digital functions of the modulator 100 take place in a radiation hardened field-programmable gate array (FPGA) 101. In one embodiment, the modulator 100 receives data in a serial data stream 102 by means of a SerDes (Serializer/Deserializer) 103, which functions up to 3.125 Gsps. In one embodiment, the serial data is buffered by buffer 104, and then encoded with the bandwidth-efficient 7/8 LDPC (Low Density Parity Check) 105 error-correcting code.

In one embodiment, the resulting encoded symbols are then randomized using randomizer 106, and then split into I and Q channels using an I/Q splitter 107. For encoded symbol rates below 400 Msps, the channel symbol streams are digitally filtered using pulse shapers 108 with a root-raised cosine filter. In one embodiment, the resulting filtered encoded I (in-phase) and Q (quadrature) data streams 128 are parallelized into 12-bit words which are each clocked out of the FPGA 101 to a digital to analog converter (DAC) 109 to form I and Q analog baseband signals 128.

In one embodiment, the I and Q baseband signals 128 are then filtered with a plurality of low pass analog filters 110. The resulting filtered baseband signals 128 are applied to the I and Q ports of a $2^{nd}$ harmonic vector modulator 111. In one embodiment, the vector modulator 111 is pumped with a local oscillator (LO) 112 from synthesizer 113. The resulting RF (radio frequency) output is an Offset Quadrature Phase Shift Keying (OQPSK) modulated signal at a center frequency equal to $2*f_{LO}+f_{IF}$, where $f_{IF}$ is the total encoded symbol rate and $f_{LO}$ is the local oscillator frequency. The RF frequency is in the Ka-band frequency range, specifically, in one embodiment, inside the Ka-band return link range of the NASA Space Network: 25.25-27.75 GHz.

In one embodiment, the digital circuitry of the present invention required to accomplish the high-speed digital processing enumerated above is radiation hardened in all of its functions, including, but not limited to the following components of the modulator 100, such as the FGPA 101 and synthesizer 113, SerDes 103, phase locked oscillators (PLO) 112, 114, 115, and I/O (input/output).

In one embodiment, the modulator 100 is designed to survive a minimum total ionizing dose of 100 krad-Si; to withstand a minimum displacement damage dose of $6.67 \times 10^8$ MeV/g (or a 10 MeV equivalent proton fluence of $8.45 \times 10^{10}$ cm$^{-2}$) and $5.50 \times 10^8$ MeV/g (or a 10 MeV equivalent proton fluence of $8.35 \times 10^{10}$ cm$^{-2}$), respectively; to have a single-event latch-up threshold exceeding 37 MeV-cm$^2$/mg; and to avoid or tolerate errors due to non-destructive Single Event Upsets.

In one embodiment, the modulated signal from vector modulator 111 is passed through low pass analog filter 116, low noise amplifier (LNA) 117, attenuated by variable voltage attenuator (VVA) 118, passed through another low noise amplifier (LNA) 119, another analog filter 120, a medium power amplifier (MPA) 121, a microstrip-to-waveguide transition (i.e., WR34) 122, to output a radio frequency (RF) signal 123. In one embodiment, the modulator RF output 123 power level can be set by external universal asynchronous receiver/transmitter (UART) command 135 to any value within the range −5 dBm-+3 dBm in 0.5 dB increments.

In one embodiment, the modulator 100 offers redundancy in DC power inputs, command/telemetry, and high speed SerDes data inputs. In one exemplary embodiment, the maximum OQPSK symbol rate is 1200 Msps, and the maximum 8-PSK symbol rate is 1800 Msps.

In one embodiment, the modulator 100 of the present invention utilizes a flexible synthesizer 113 architecture (see FIGS. 1-2) with switched tunable baseband filter bank (filters 110), to provide baseband filtering of the symbol stream, and enable flexible symbol rate operation while meeting space network spectral masks.

In one embodiment, the present invention allows dynamically selecting during operation, the RF center frequency with 1 kHz resolution throughout, for example, the entire NASA Space Network Ka-band return link (25.25 GHz-27.50 GHz), via external UART 135 commands.

In one embodiment, the synthesizer 113 also permits dynamic selection during operation of the symbol rate with 100 Hz resolution over the range 125-1200 Msps for OQPSK modulation and 187.5-1800 Msps for 8-PSK modulation without gaps via UART 135 commands.

In one embodiment, the OQPSK and 8-PSK ranges can be decreased to 62.5-600 Msps and 93.75-900 Msps, respectively, with the substitution of a different pre-scaler during manufacturing. In one embodiment, the SerDes clock 114 can be selected with 100 Hz resolution over the range 100-160 MHz by jumper selection during manufacturing. In one embodiment, the SerDes clock 114 does not change during operation.

Figure 2:
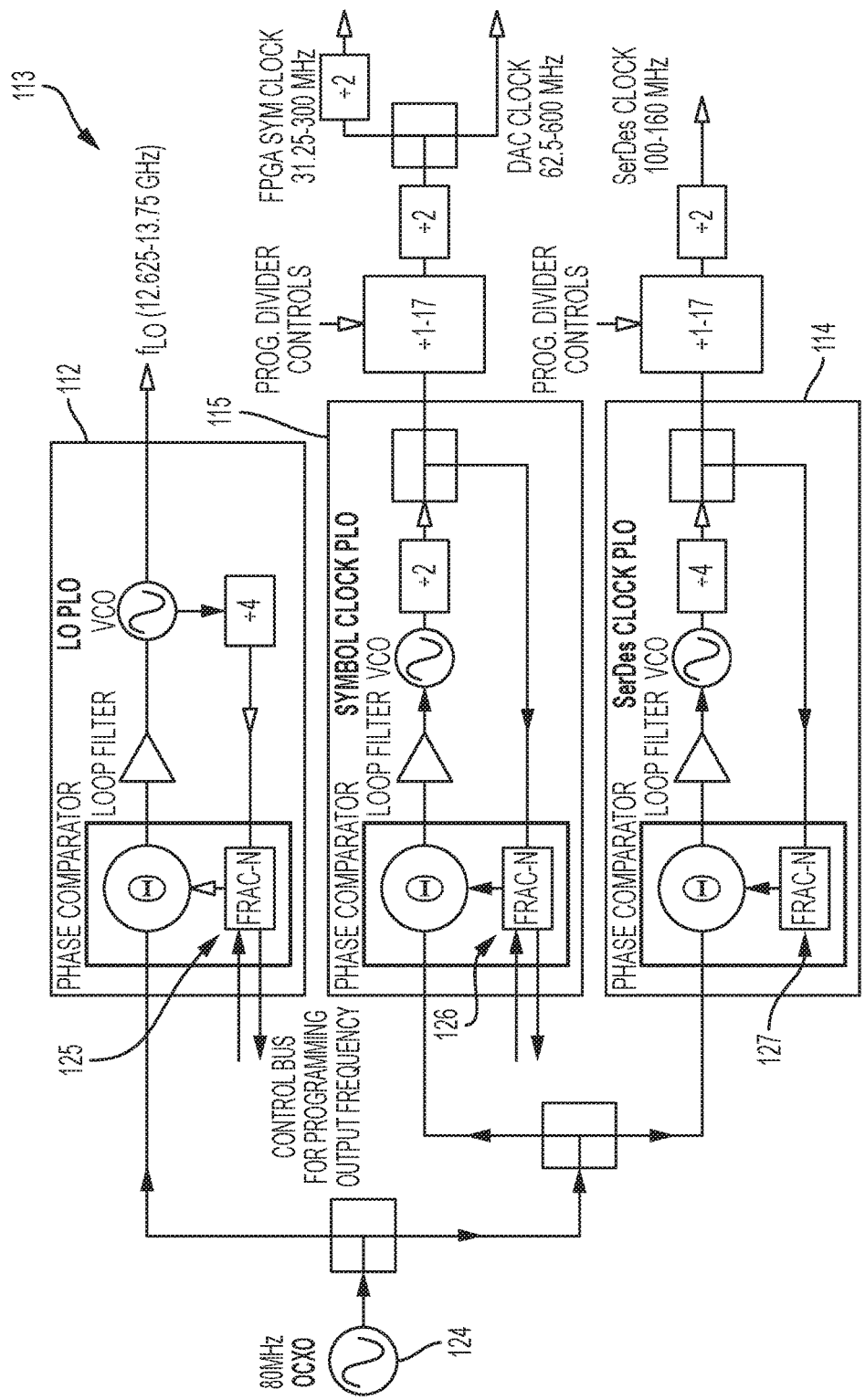
FIG. 2 depicts a detailed schematic diagram of the synthesizer of FIG. 1, according to one embodiment consistent with the present invention.
Figure 3:
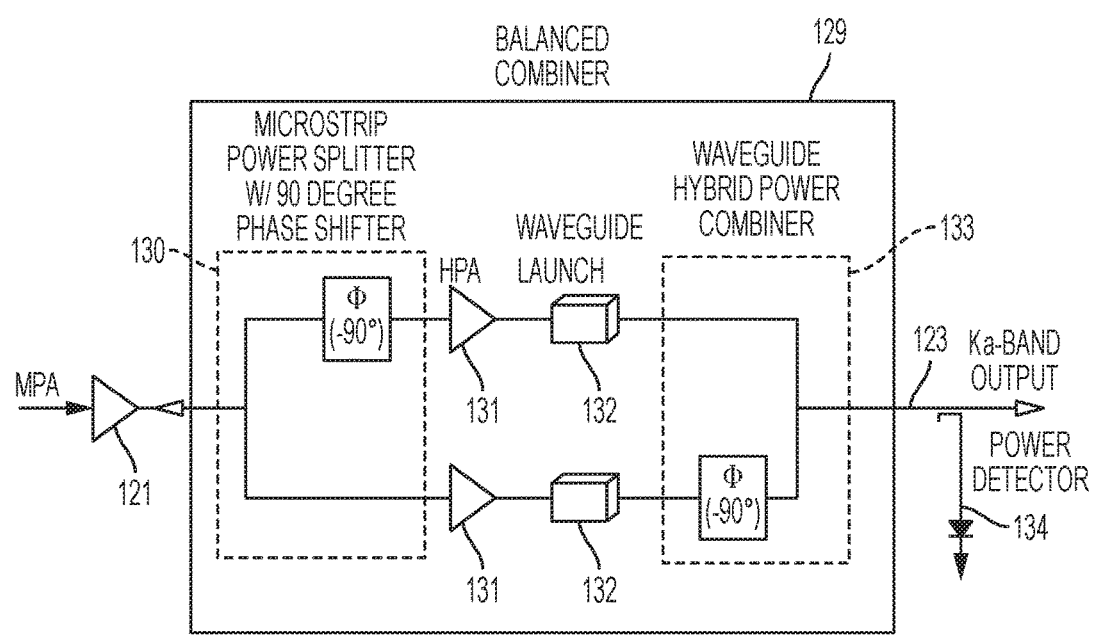
FIG. 3 depicts a balanced combiner, used with the Ka-band transmitter of FIG. 1, according to one embodiment consistent with the present invention.

In one embodiment, the programmability of the frequencies does not require exchanging any reference oscillator 110. In one embodiment, as shown in FIG. 2, the symbol clock 115 (31.25-300 MHz), the RF center frequency (25.25-27. GHz) at the transmitter output 123, and the SerDes clock 114 (100-160 MHz) (and DAC 109 clock (62.5-600 MHz)), are all coherent with a single reference oscillator 124, such as an oven-controlled crystal oscillator (OCXO) 124. The flexibility is accomplished by means of a combination of fractional-N phase-locked oscillators 125, 126, 127 and the architecture.

In one embodiment, the baseband signals 128 into the vector modulator 111 require digital pulse shaping together with supplemental analog low pass filtering (using a plurality of filters 110) at rates below 400 Msps, for example, to meet NASA spectral mask requirements. At rates of 400 Msps and above, analog filtering is used exclusively for baseband filtering (filters 110).

To provide adequate spectral filtering to meet EMI masks, for example, the low pass filter cutoff must track the symbol rate. In one embodiment, to accommodate the wide range of symbol rates, the modulator 111 uses a switched, tunable filter bank (i.e., the plurality of filters 110). In one embodiment, the symbol rate range is divided into four sub-ranges, each assigned to a specific filter in, for example, the four-filter bank 110. When the symbol rate is selected, the appropriate baseband filter in the filter bank 110 is selected by setting the control lines of the input and output radio frequency (RF) single switches SS4T (Single Pull 4-Throw switches). In addition, the cutoff frequency of each filter in the filter bank 110 is tunable so that the exact filter cutoff frequency suitable for a given symbol rate can be selected.

In one embodiment, the tuning of the Ka-band modulator and transmitter 100 is accomplished by applying a control voltage to variable capacitance diodes (i.e., varactors) in the low pass filters 110 with a digital-to-analogue converter (DAC) 109. The FPGA 101 writes a 10-bit control word to the DAC 109 based on an algorithm that relates the varactor control voltages to the required cutoff frequencies. Without a tunable filter bank 110, it would not be possible to filter baseband data signals 128 at high symbol rates. The filter bank 110 in conjunction with the synthesizer 113 architecture, allow for a programmable range of symbol rates with baseband filtering.

As stated above, in one embodiment, the transmitter 100 can be configured during manufacturing to produce a commandable output level in the range −5-+3 dBm (see RF output 123) in 0.5 dB increments to drive a travelling wave tube amplifier (TWTA) or a 10 W high power output by means of an integral solid-state power amplifier (PA).

In one embodiment, a balanced power combiner 129 is inserted between the medium power amplifier (MPA) 121 output and the transmitter output 123. The balanced combiner 123 includes a Schiffer 90 degrees phase shifter 130 which splits the power evenly between two outputs but introduces a phase shift of 90 degrees between the two outputs and a Riblet waveguide 3 dB hybrid coupler 133, which combines the power inputs evenly and introduces a phase shift in the opposite branch. Using a Schiffer combiner 130 and a Riblet waveguide combiner 133 gives wideband phase and amplitude balance over the desired band, such as the NASA Space Network Ka-band return link band of 25.25-27.5 GHz. The microstrip-to-waveguide transition 122 converts microstrip signals to waveguide signals. A waveguide implementation of the second half of the balanced combiner 129 is important in a high-power amplifier (HPA) 131 to minimize output losses.

In one embodiment, the present invention provides a compact packaging design designed for space reliability and manufacturability.

The present invention provides novel advantages such as:

(a) providing a wide range of data rates with small frequency steps;

(b) providing high data rate capabilities, 1200 Mbps with QPSK modulation and 1800 Mbps with 8PSK modulation;

(c) providing a low noise carrier that allows the transmitter to be operational over the entire near-earth Ka-band return link (25.25 GHz to 27.5 GHz);

(d) providing an internal frequency synthesizer design which enables both the Ka-band carrier and the data clock to be commandable on tasks such as orbit, with fine frequency steps;

(e) providing internal re-clocking of the data, and maximizing data signal integrity;

(f) providing wide bandwidth performance of the modulator and associated microwave components enabling high data rate performance;

(g) providing incorporation of a switched filter bank, enabling meeting, for example, the National Telecommunications and Information Administration (NTIA) standards for a spectral mask over the range of data rates;

(h) providing a high-speed data interface enabling high data rates using low FPGA clock rates compatible with field programmable gate arrays (FPGAs), for tasks such as space flight missions;

(i) providing an efficient 5 W and 10 W solid state power amplifier (SSPA) design with microstrip-to-waveguide transition and waveguide combiner; and (j) providing an adjustable output of −5 dBm to +3 dBm for an external TWTA.

The present invention differs from existing commercially available Ka-band transmitters by being more high performing, versatile, or reliable.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. A Ka-band transmitter, comprising:
a first modulator including a field programmable gate array (FPGA), said FPGA including:
  a serializer/deserializer (SerDes), which receives data in a data stream;
  a buffer which buffers said data in said data stream from the serializer/deserializer;
  a low-density parity check (LDPC) encoder which encodes said data in said data stream from the buffer with a 7/8 LDPC error-correcting code to result in a data stream of encoded symbols;
  a randomizer which randomizes said encoded symbols in said data stream;
  an in-phase/quadrature (I/Q) splitter which splits said randomized encoded symbols in said data stream into an I channel data stream and a Q channel data stream; and
  a plurality of pulse shapers for each of said I channel data stream and said Q channel data stream, such that rates of said I channel data stream and said Q channel data stream of said encoded symbols below 400 Msps are digitally filtered with a root-raised cosine filter;
  wherein resulting digitally filtered encoded symbols in said I channel data stream and said Q channel data stream are parallelized into 12-bit words which are each clocked exiting said FPGA;
a plurality of digital-to-analog converters (DACs) which receive said 12-bit words from said FPGA to form an I analog baseband signal and a Q analog baseband signal;
a tunable filter bank including a plurality of low-pass analog filters which filter said I analog baseband signal and said Q analog baseband signal;
a second harmonic vector modulator which receives said I analog baseband signal and said Q analog baseband signal from said tunable filter bank; and
a synthesizer including a local oscillator which pumps said second harmonic vector modulator to output a radio frequency (RF) signal;
wherein said RF signal is an Offset Quadrature Phase Shift Keying (OQPSK) modulated signal at a center frequency equal to: $2*f_{Lo}+f_{IF}$, where $f_{IF}$ is a total encoded symbol rate and $f_{Lo}$ is a local oscillator frequency; and wherein said RF signal is in a Ka-band frequency range including inside a Ka-band return link range of 25.25-27.75 GHz.

2. The transmitter of claim 1, further comprising:
a first low-pass analog filter which receives output from said second harmonic vector modulator;
a first low-noise amplifier (LNA) which receives output from said first low-pass analog filter;
a variable-voltage attenuator (VVA) which attenuates said output from said first low-noise amplifier (LNA);
a second low-noise amplifier (LNA) which receives said attenuated output from said variable-voltage attenuator (VVA);
a second low-pass analog filter which receives output from said second low-noise amplifier (LNA);
a medium-power amplifier (MPA) which receives output from said second low-pass analog filter and emits a signal output; and
a microstrip-to-waveguide transition which receives said signal output from said medium-power amplifier (MPA) and converts said signal output to a waveguide signal output, to produce said radio frequency (RF) output.

3. The transmitter of claim 2, further comprising:
a balanced power combiner disposed between said medium power amplifier (MPA) and said microstrip-to-waveguide transition, said balanced combiner which includes a 90-degrees phase shifter which splits output from said medium-power amplifier (MPA) evenly from said phase shifter into two power outputs and forwards said two power outputs to a waveguide hybrid coupler;
wherein said phase shifter and said waveguide hybrid coupler provide wideband phase and amplitude balance over said Ka-band return link range of 25.25-27.75 GHz.

4. The transmitter of claim 3, wherein said balanced power combiner further comprises:
two high-power amplifiers which receive said two power outputs from said phase shifter;
wherein said waveguide hybrid coupler minimizes output losses in said two high-power amplifiers.

5. The transmitter of claim 4, wherein said SerDes functions up to 3.125 Gsps.

6. The transmitter of claim 4, wherein a power level of said radio frequency (RF) output can be set within any value within a range of −5 dBm-+3 dBm in 0.5 dB increments, using external universal asynchronous receiver/transmitter (UART) commands.

7. The transmitter of claim 6, wherein a maximum rate of said OQPSK signal is 1200 Msps, and a maximum 8-PSK symbol rate is 1800 Msps.

8. The transmitter of claim 7, wherein said synthesizer further includes:
a serializer/deserializer (Ser/Des) clock;
a symbol clock; and
a reference oscillator;
wherein said local oscillator, said serializer/deserializer (Ser/Des) clock, and a clock of at least one of said digital-to-analog converters (DAC), are all coherent with said reference oscillator.

9. The transmitter of claim 8, wherein said reference oscillator is an oven-controlled crystal oscillator.

10. The transmitter of claim 8, wherein said SerDes clock 114 has a 100 Hz resolution over a range 100-160 MHz.

11. The transmitter of claim 8, wherein said filtered I baseband signal and said filtered Q baseband signal received by said second harmonic vector modulator require digital pulse shaping with said plurality of low-pass analog filters, at below said rate of 400 Msps, to meet predetermined spectral mask requirements.

12. The transmitter of claim 11, wherein said plurality of low-pass analog filters are used exclusively for baseband filtering at rates of 400 Msps and above.

13. The transmitter of claim 11, wherein said tunable filter bank comprises four low-pass analog filters, and a range of symbol rate is divided into four sub-ranges each assigned to one filter of each of said four low-pass analog filters; and
wherein when a symbol rate is selected, an appropriate one of said four low-pass analog filters is selected by setting control lines of an input and an output radio frequency (RF) single pull 4-throw switches (SS4T).

14. The transmitter of claim 13, wherein a cutoff frequency of each of said four low-pass analog filters is tunable so that an exact filter cutoff frequency suitable for a given symbol rate can be selected.

15. The transmitter of claim 14, wherein a plurality of variable capacitance diodes comprises said plurality of low-pass analog filters; and
wherein a tuning of said modulator and the transmitter is accomplished by applying a control voltage to said variable capacitance diodes with said digital-to-analogue converters (DACs).

16. The transmitter of claim 1, wherein said first modulator can survive a minimum total ionizing dose of 100 kRad-Si, a minimum displacement damage dose of $6.67 \times 10^8$ MeV/g or a 10 MeV equivalent proton fluence of $8.45 \times 10^{10}$ cm$^{-2}$; a $5.50 \times 10^8$ MeV/g or a 10 MeV equivalent proton fluence of $8.35 \times 10^{10}$ cm$^{-2}$, and a single-event latch-up threshold exceeding 37 MeV-cm$^2$/mg.

17. A method of providing a high data rate Ka-band modulator and transmitter for space applications, comprising:
receiving data in a data stream into a serializer/deserializer (SerDes) of a field programmable gate array (FPGA) of a first modulator;
buffering said data from said serializer/deserializer (SerDes);
encoding said buffered data in said serial data stream using a low-density parity check (LDPC) encoder with a 7/8 LDPC error-correcting code to result in a data stream of encoded symbols;
randomizing said encoded symbols in said data stream;
splitting said randomized encoded symbols in said serial data stream into an I channel data stream and a Q channel data stream;
digitally filtering each of said I channel data stream and said Q channel data stream, such that rates of said I channel data stream and said Q channel data stream of said encoded symbols below 400 Msps are digitally filtered with a root-raised cosine filter;
parallelizing resulting digitally filtered encoded symbols in said I channel data stream and said Q channel data stream into 12-bit words which are each clocked exiting said FPGA;
receiving said 12-bit words from said FPGA into a plurality of digital-to-analog converters (DACs) to form an I analog baseband signal and a Q analog baseband signal;
filtering said I analog baseband signal and said Q analog baseband signal using a tunable filter bank having a plurality of low-pass analog filters;
receiving said filtered I analog baseband signal and said Q analog baseband signal into a second harmonic vector modulator;

pumping said second harmonic vector modulator using a synthesizer having a local oscillator to output a radio frequency (RF) signal;

wherein said RF signal is an Offset Quadrature Phase Shift Keying (OQPSK) modulated signal at a center frequency equal to: where fIF is a total encoded symbol rate and fLo is a local oscillator frequency; and wherein said RF signal is in a Ka-band frequency range including inside a Ka-band return link range of 25.25-27.75 GHz.

18. The method of claim 17, wherein a power level of said radio frequency (RF) output can be set within any value within a range of −5 dBm-+3 dBm in 0.5 dB increments, using external universal asynchronous receiver/transmitter (UART) commands.

19. The method of claim 18, wherein a maximum rate of said OQPSK signal is 1200 Msps, and a maximum 8-PSK symbol rate is 1800 Msps.

20. The method of claim 19, wherein said filtered I baseband signal and said filtered Q baseband signal received by said second harmonic vector modulator require digital pulse shaping with said plurality of low-pass analog filters, at below said rate of 400 Msps, to meet predetermined spectral mask requirements; and wherein said plurality of low-pass analog filters are used exclusively for baseband filtering at rates of 400 Msps and above.

\* \* \* \* \*